United States Patent
Scott et al.

[11] Patent Number: 5,952,566
[45] Date of Patent: Sep. 14, 1999

[54] DUAL VALVE APPARATUS FOR ENABLING QUICK MEASUREMENT OF PRESSURE

[75] Inventors: Daniel G. Scott, Pittsburgh; Gregory L. Johnston, Tarentum; Michael Veltri, Pittsburgh, all of Pa.

[73] Assignee: Westinghouse Air Brake Company, Wilmerding, Pa.

[21] Appl. No.: 08/968,270

[22] Filed: Nov. 12, 1997

[51] Int. Cl.[6] .................................. G01L 5/28; G01L 7/00
[52] U.S. Cl. ................................................. 73/121; 73/714
[58] Field of Search ........................................ 73/1.71, 1.72, 73/121, 132, 146.3, 709, 714, 756; 303/81, 86; 188/52, 198

[56] References Cited

U.S. PATENT DOCUMENTS

| | | | |
|---|---|---|---|
| 3,951,468 | 4/1976 | Kolbeck | 303/81 |
| 3,999,430 | 12/1976 | Parduhn | 73/146.3 |
| 4,258,830 | 3/1981 | Pearson et al. | 188/52 |
| 5,714,684 | 2/1998 | Gaughan | 73/121 |

Primary Examiner—William Oen
Attorney, Agent, or Firm—James Ray & Associates

[57] ABSTRACT

A dual valve apparatus enables quick measurement of pressure contained within a housing. The housing has a main body, a check valve housed in the main body and a cover whose removal renders the check valve accessible. The check valve is normally compressed against a check valve seat to provide a first seal that prevents leakage of the pressure. The dual valve apparatus includes a modified cover, a valve body and a valve stem. The modified cover defines first and second bores axially offset from and in communication with one another. The first bore is at least partially threaded. When the modified cover is secured to the main body, the second bore is aligned with the check valve. The valve body accommodates a valve bore from its protuberant end to its threaded end. The protuberant end is shaped to mate with a female portion of a quick connect coupling. The threaded end screws into the first bore of the modified cover. Movable within the bores, the valve stem at its head end is normally compressed against a valve seat formed within the protuberant end of the valve bore to provide a second seal that further prevents leakage of the pressure. Mating the female portion to the protuberant end of the dual valve apparatus causes the valve stem to move away from its seat. The valve stem in turn unseats the check valve thereby providing access to and enabling measurement of the pressure.

19 Claims, 6 Drawing Sheets

DUAL VALVE APPARATUS FOR ENABLING QUICK MEASUREMENT OF PRESSURE

CROSS-REFERENCE TO RELATED APPLICATIONS

This application is related to a copending U.S. application entitled: Dual Seal Coupling Apparatus For Enabling Quick Measurement Of Brake Cylinder Pressure, Ser. No. 08/901,606, filed on Jul. 28, 1997. The copending application is assigned to the assignee of the present invention and its teachings are incorporated into this document by reference.

FIELD OF THE INVENTION

The present invention generally relates to a mechanism through which to gain access to a pressure to be measured. More particularly, the invention relates to an apparatus that allows quick measurement of brake cylinder pressure through a receiver assembly of a pneumatic control valve of a railcar.

BACKGROUND OF THE INVENTION

A typical freight train includes one or more locomotives, a plurality of railcars and a pneumatic trainline referred to as the brake pipe. The brake pipe consists of a series of individual pipe lengths interconnected to each other. One pipe length secured to the underside of each railcar interconnects to another such pipe length via a flexible coupler situated between each railcar. The brake pipe supplies the pressurized air that i., required by the brake control system to charge the various reservoirs and operate the air brake equipment on each railcar in the freight train.

A train operator situated in the lead locomotive can manipulate a brake handle to apply and release the brakes on the railcars as desired. The brake handle can be moved from and in between a release position at one extreme in which brake pipe pressure is maximum and the brakes are completely released to an emergency position at another extreme in which brake pipe pressure is minimal and the brakes are fully applied. The brake handle positions thus include brake release, minimum service brake application, full service brake application and emergency brake application. When the brakes are released, the reservoirs and the brake pipe are generally charged to the same pressure: typically 90 psi on a freight train and 110 psi on a passenger train. When the brakes are applied, the pressure in the brake pipe is reduced via a valve located in the lead locomotive. The exact amount by which the pressure is reduced depends into which of the application positions the brake handle is placed. It is this pressure reduction that signals the brake control valve on each railcar to supply pressurized air from the appropriate reservoir(s) to the brake cylinders. The brake cylinders convert this pressure to the mechanical force which the brake shoes apply to slow or stop the rotation of the wheels on the railcar.

The brake equipment on each railcar of a freight train typically includes one or more brake cylinders, an emergency air reservoir, an auxiliary air reservoir and a conventional pneumatic brake control system having an "ABD" or similar type control valve. FIG. 1a illustrates a schematic diagram of an ABD type pneumatic brake control valve made by the Westinghouse Air Brake Company (WABCO). This control valve includes a service portion and an emergency portion typically mounted on opposite sides of a pipe bracket. It should be noted that there exists at least one other type of pipe bracket on which the service and emergency portions are mounted on the same side. Whether dealing with the dual sided or single sided variety, the pipe bracket features a number of internal passages and several ports. Each port connects to one of the interconnecting pipes from the railcar such as those leading to the brake pipe, the brake cylinder, the emergency reservoir and the auxiliary reservoir. It is through these ports and internal passages of the pipe bracket that the service and emergency portions of the brake control valve communicate fluidly with the pneumatic piping on the railcar.

The service and emergency portions of the brake control valve operate according to principles well known in the railroad industry. The service portion of the brake control valve performs several functions including (1) controlling the flow of air from the auxiliary reservoir to the brake cylinder during a service brake application, (2) controlling the recharging of the auxiliary and emergency reservoirs and (3) controlling the exhausting of the brake cylinder when the brakes are released. The emergency portion of the brake control valve controls, among other things, the flow of air from both reservoirs to the brake cylinder during an emergency brake application.

The American Association of Railroads (A.A.R.) has issued specification S-486-91 detailing the basic test procedures that must be performed periodically on the brake equipment of every railcar. It requires that the brake equipment be charged and tested for leaks. There exists a standard A.A.R. test device that can be used to perform such testing, but it is rather complicated and requires interpretation by a very skilled user to identify problems with the brake equipment. Accordingly, in U.S. application Ser. No. 08/365,815, WABCO has described and claimed an Automated Single Car Tester that can perform the requisite tests more reliably and quickly than the standard A.A.R. Test device. This copending application is assigned to the assignee of the present invention and its teachings are incorporated into this document by reference.

Among other functions, the Automated Single Car Tester is used to measure the pressure at various points within the brake control system of the railcar. The single sided pipe bracket has a receiver assembly mounted to same side of the pipe bracket to which the service and emergency portions of the control valve mount. This receiver assembly provides the Automated Single Car Tester with quick and direct access to certain internal passageways of the pipe bracket and ultimately the pneumatic pipes and reservoirs whose pressure must be tested. Specifically, through the receiver assembly, the Automated Single Car Tester can measure pressure within the brake cylinder, the brake pipe, the emergency reservoir and the auxiliary reservoir. The dual sided pipe bracket, however, has its ports located on its rear side. Consequently, it is quite difficult to access the ports and the pipes that connect to them. Therefore, for railcars equipped with the dual sided pipe bracket, the Automated Single Car Tester is used in conjunction with a combination access and receiver assembly. This access plate portion of the assembly is typically connected between the pipe bracket and the service portion of the control valve as shown in FIGS. 1a and 1b. The receiver portion is assembled as shown in FIG. 1d. Connected to form the combined assembly as shown in FIG. 1b, the receiver portion together with the access plate provide access to the internal passageways of the pipe bracket. For railcars equipped with the dual sided pipe bracket, the combined assembly is the part through which the Automated Single Car Tester can measure the pressure within the brake cylinder, the brake pipe, the emergency reservoir and the auxiliary reservoir.

As will be apparent from the ensuing description and claims, the receiver portion and the receiver assembly of the two aforementioned pipe brackets are identical except in respects immaterial to the present invention. It is for this reason that the terms "receiver assembly" and "receiver portion" shall hereinafter be used interchangeably.

As shown in FIG. 1d, the receiver assembly includes a cover, a receiver body and four check valves housed in bores defined in the receiver body. Each check valve basically includes a shaped insert made of rubber or other suitable sealing material, a carrier that holds the shaped insert and a spring. Consequently, each check valve is normally compressed against a check valve seat formed at the top of its bore. A gasket and typically a filter are also used with each check valve. When the receiver assembly is mounted to the control valve, the check valves, at the head of the receiver body, are accessible by removal of the cover. Each check valve thus serves as an access port through which to access the pressure held in one of the following devices: the brake cylinder, the brake pipe and the emergency and auxiliary reservoirs. Even with the cover removed, each check valve prevents leakage of the pressurized air that it is supposed to contain.

The Automated Single Car Tester includes a pneumatic connector designed to mate with the head of the receiver body and thereby to each of the four access ports. By moving each check valve away from its check valve seat, the tester can charge and measure the pressure within the brake cylinder, the brake pipe, the emergency reservoir and/or the auxiliary reservoir.

The A.A.R. has proposed that each railcar of a freight train be provided with a mechanism that would allow the pressure within the brake cylinder to be read quickly. At present, the A.A.R. is considering whether to issue a specification requiring that a commercially available quick connect type fitting be used to access the pressure within the brake cylinder. The disadvantage of such a fitting, however, is that it provides only a single valve with which to contain the pressure to be measured. That is, while such a fitting is not being used to access the pressure, it offers only one seal to prevent leakage of the pressure that it is supposed to contain. Unless the fitting is routinely covered to protect the valve when the fitting is not being used to access the brake cylinder pressure, the valve is exposed to dust, dirt and/or other potential contaminants. It is, of course, important that such a fitting prevent leakage of pressure from the brake cylinder otherwise operation of the brakes may be adversely affected.

It should be noted that the foregoing background information is provided to assist the reader in understanding the present invention. Accordingly, any terms used herein are not intended to be limited to any particular narrow interpretation unless specifically stated otherwise in this document.

OBJECTIVES OF THE INVENTION

It is, therefore, a primary objective of the invention to provide an apparatus that allows the pressure within a brake cylinder of a railcar to be measured quickly via the receiver assembly of the brake control valve.

Another objective is to render the pressure within the brake cylinder quickly measurable with an apparatus that features two valves so if one valve should leak the other valve will prevent leakage of the air that the apparatus is supposed to contain.

Yet another objective is to endow such apparatus at one end with the shape of a male portion of a commercially available quick connect coupling so that the pressure within the brake cylinder can be measured quickly by mating to the male portion a corresponding female portion which has attached at its other end a pressure measuring device.

Still another objective of the invention is to provide such a dual valve apparatus to enable quick measurement of pressure within any one or more of the brake cylinder, the brake pipe, the emergency reservoir and the auxiliary reservoir on a railcar.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the attached drawings and with the appended claims.

SUMMARY OF THE INVENTION

The present invention provides a dual valve apparatus for enabling quick measurement of pressure contained within a receiver assembly. The receiver assembly has a receiver body, a cover for the receiver body and at least one check valve housed in the receiver body. The check valve is accessible by removal of the cover. The check valve is normally compressed against a check valve seat formed in the receiver body to provide a first seal that prevents leakage of the pressure. The dual valve apparatus includes a modified cover, a valve body and a valve stem. The modified cover defines first and second bores axially offset from and in communication with one another. The first bore is at least partially threaded. When the modified cover is secured to the receiver body, the second bore is aligned generally with the check valve. The valve body defines through itself a valve bore from its protuberant end to its threaded end. The protuberant end is shaped to mate with a female portion of a quick connect coupling. The threaded end is designed to screw into the first bore of the modified cover. Movable within the bores, the valve stem at its head end is normally compressed against a valve stem seat formed in the protuberant end of the valve bore to provide a second seal that further prevents leakage of the pressure. Hating the female portion to the protuberant end of the apparatus causes the valve stem to move away from its valve stem seat. The valve stem in turn pushes the check valve away from its check valve seat thereby providing access to and enabling measurement of the pressure.

BRIEF DESCRIPTION OF THE DRAWINGS

FIG. 1b is an exploded view of the ABD type pneumatic brake control valve illustrated in FIG. 1a.

DETAILED DESCRIPTION OF THE INVENTION

Figure 1A:
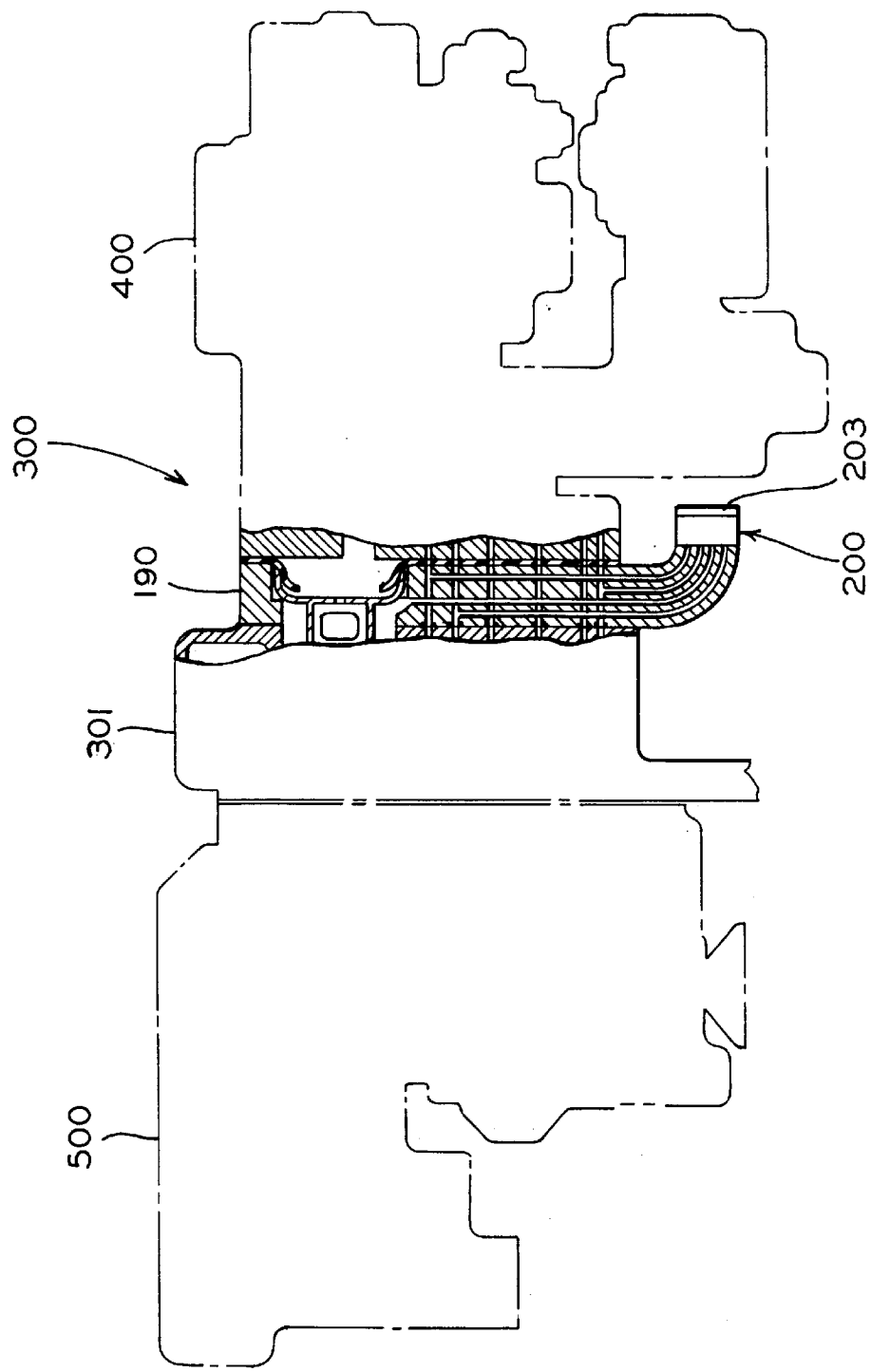
FIG. 1a is a schematic diagram of an ABD type pneumatic brake control valve featuring an access and receiver assembly.

Before describing the invention in detail, the reader is advised that, for the sake of clarity and understanding, identical components having identical functions in each of the accompanying drawings have been marked where possible with the same reference numerals in each of the Figures provided in this document.

Figure 1B:
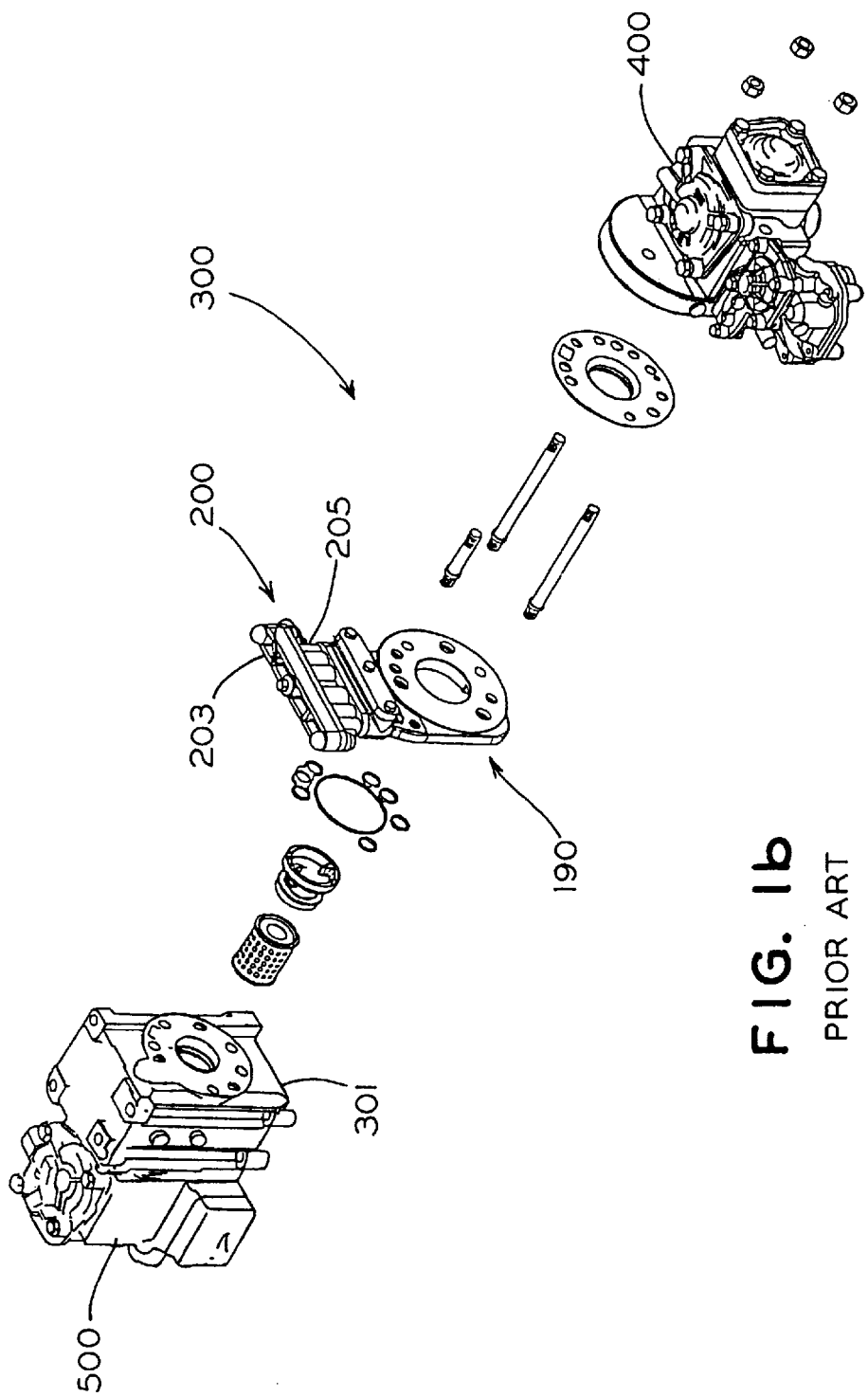
Figure 1C:
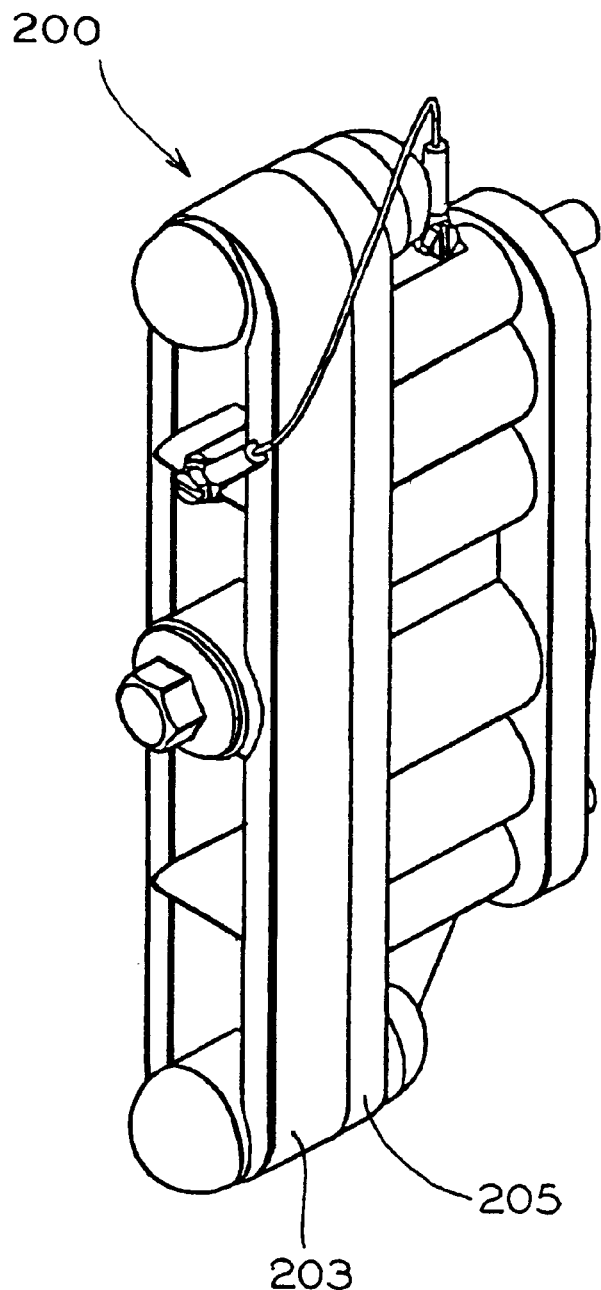
FIG. 1c is an enlarged perspective view of the receiver assembly illustrated in FIGS. 1a and 1b.

FIGS. 1a–d each illustrate a receiver assembly 200 of a pneumatic control valve 300 of a railcar. The control valve 300 includes a service portion 400 and an emergency portion 500 mounted to a pipe bracket 301. Though FIGS. 1a and 1b show the receiver portion 200 of the access and receiver assembly 190 used in connection with the dual sided pipe bracket 301, it is again noted that in this document the term "receiver assembly" also encompasses the receiver assembly used in connection with the aforementioned single sided pipe bracket (not shown).

Figure 1D:
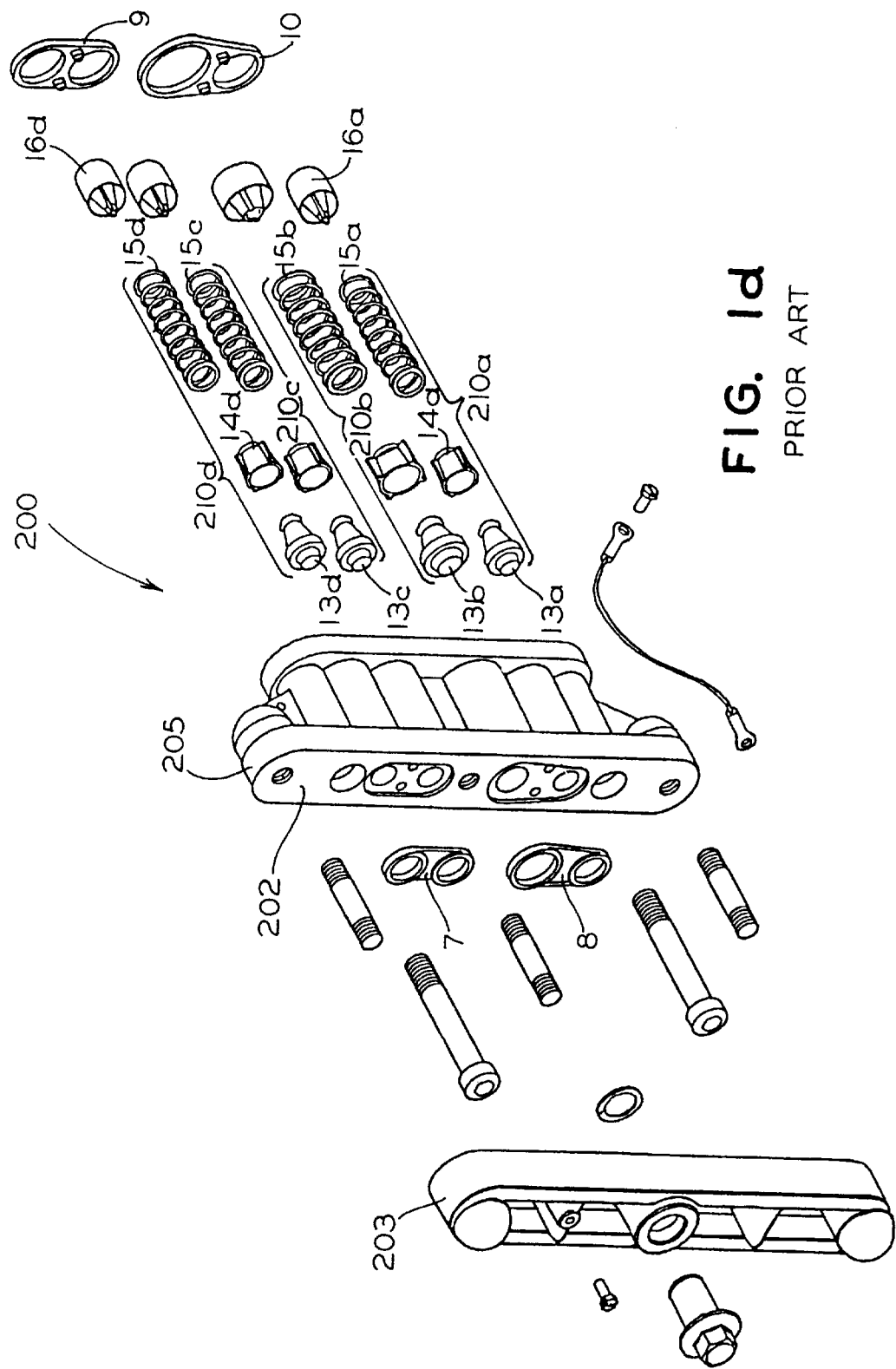
FIG. 1d is an exploded view of the receiver assembly illustrated in FIG. 1c.

The receiver assembly 200 includes a cover 203, a receiver body 205 and four check valves 210a–d housed in bores defined in the receiver body 205. As best shown in FIG. 1d, each check valve basically includes a shaped insert 13a–d made of rubber or other suitable sealing material, a carrier 14a–d that holds the shaped insert and a spring 15a–d. Gaskets 7–10 and filters 16a–d are also used with the check valves. Consequently, each check valve is normally compressed against a check valve seat formed at or near the top of its bore. When the receiver assembly 200 is mounted to the control valve 300 as indicated in FIGS. 1b and 1d, for example, the check valves, at the head 202 of the receiver body 205, are accessible by removal of the cover 203. Check valve 210a serves as the access port through which to access the pressure in the brake cylinder. Check valve 210b serves as the access port through which to access the pressure in the brake pipe. Check valves 210c and 210d serve as the access ports through which to access the pressure in the auxiliary and emergency reservoirs, respectively. Each check valve prevents leakage of the air pressure that it is intended to contain, even with cover 203 removed. The gaskets 7 and 8 serve as a supplement to the seal provided by each of the check valves 210a–d.

Figure 2:
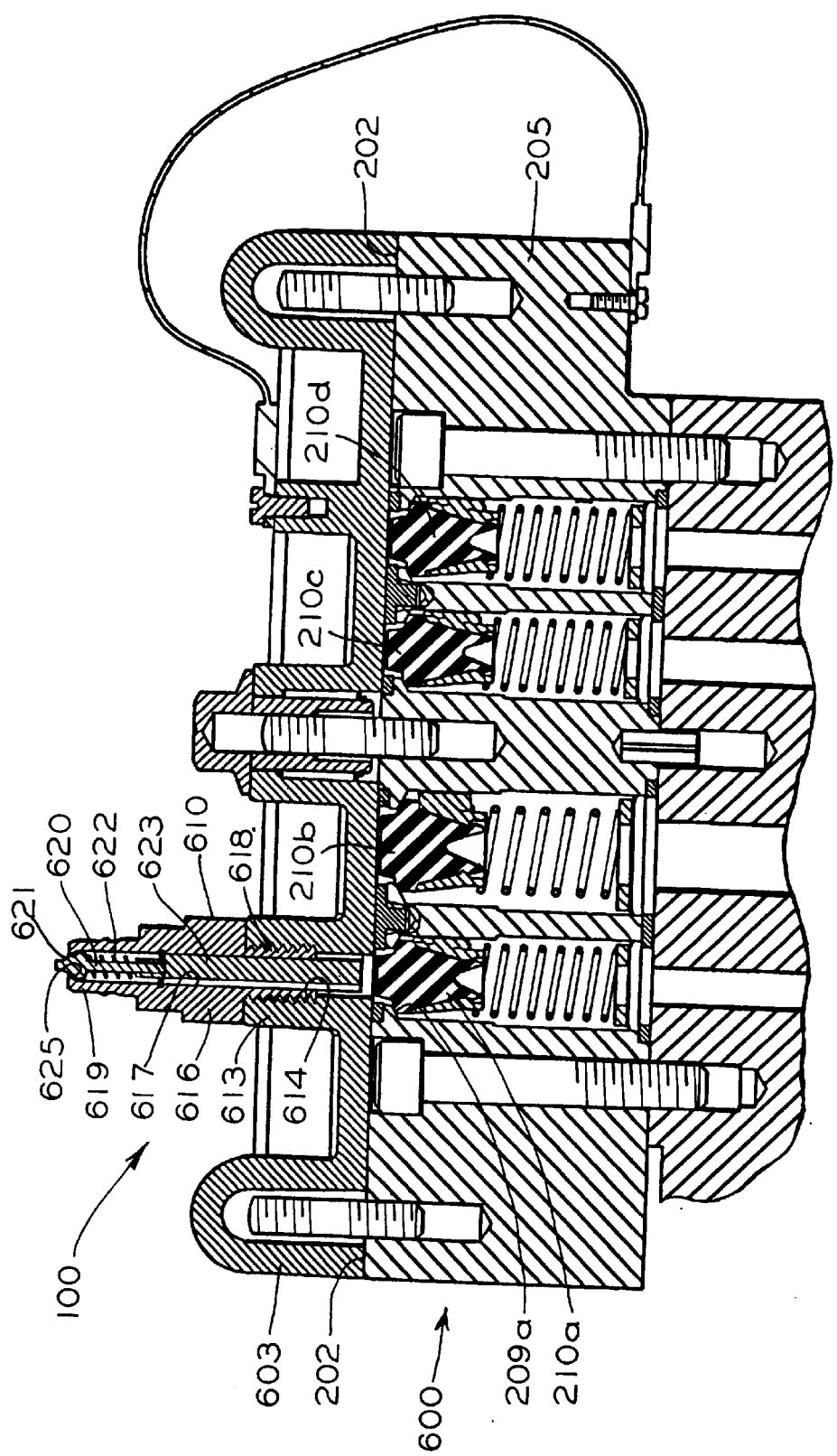
FIG. 2 is a cross sectional view of a receiver assembly incorporating the dual seal coupling apparatus described and claimed in U.S. application Ser. No. 08/901,606.

In view of the specification forthcoming from the A.A.R., the aforementioned U.S. application Ser. No. 08/901,606 describes and claims a dual seal coupling apparatus that was designed to enable quick measurement of brake cylinder pressure through a receiver assembly. As shown in FIG. 2 of that document and reproduced as FIG. 2 herein, the dual seal coupling apparatus includes the modified receiver assembly 600 and a male portion 610 of a quick connect coupling. The modified receiver assembly 600 includes the receiver body 205 and the four check valves 210a–d disposed in generally the same manner as in the prior art receiver assembly shown in FIGS. 1a–d. The cover 603 of the modified receiver assembly 600 shown in FIG. 2, however, features a boss 613 protruding from its surface. The boss 613 defines through itself a bore 614 whose cylindrical wall is at least partially threaded so as to receive a threaded end 618 of the male portion 610 of the quick connect coupling. The threaded bore 614 is aligned axially with check valve 210a when the cover 603 is secured to receiver body 205. By its threaded end 618, the male portion 610 screws into the threaded bore 614 of the cover 603. At its opposite end 619, the male portion 610 is shaped to be mated to a corresponding female portion of the quick connect coupling. With its dual seal arrangement, the invention described and claimed in that earlier filed document overcomes the problems associated with prior art quick connect type fittings.

It has been discovered that to produce the cover 603 described and claimed in the aforementioned document would require significant changes to the manufacturing equipment used to produce the original cover at substantial cost. Specifically, it is currently disadvantageous to produce a cover with a boss whose threaded bore will axially align with check valve 210a when the cover is secured to receiver body 205. For these reasons, the present invention has been conceived and is described and claimed in the following text.

Figure 3:
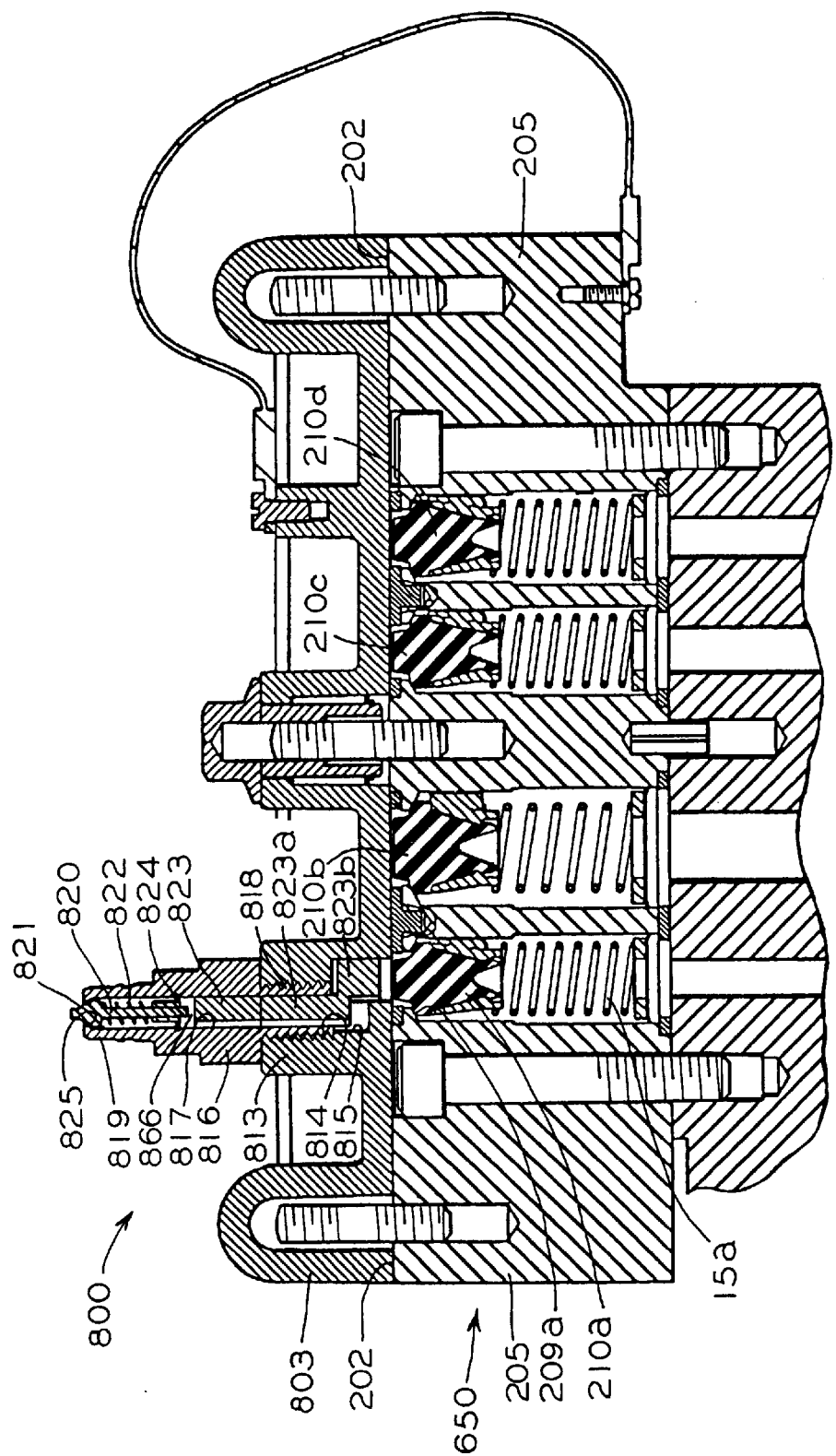
FIG. 3 is a cross sectional view of a receiver assembly incorporating the dual valve apparatus according to the present invention.

FIG. 3 illustrates the essential details of a presently preferred embodiment of a dual valve apparatus 800. The dual valve apparatus 800 enables quick measurement of the brake cylinder pressure through a modified receiver assembly of a pneumatic brake control valve 300 on a railcar. The receiver assembly 650 used with the invention is generally identical to the receiver assembly 200, shown in FIGS. 1a–d, except for the modified cover 803 illustrated in FIG. 3 and described below. The modified cover 803 features a boss 813 that protrudes from its top surface.

The dual valve apparatus 800 basically includes the modified cover 803, a valve body 816, a valve stem piece 820 and an extension 823. The modified cover 803 with its boss defines through itself first and second bores 814 and 815. As shown in FIG. 3, these two bores are axially offset from one another but yet still communicate. The first bore 814 of modified cover 803 is at least partially internally threaded to accommodate one end of the valve body 816 as provided below. When the modified cover 803 is secured to receiver body 205 by bolts or other means, the second bore 815 is aligned generally with the top of check valve 210a.

The valve body 816 has a protuberant end 819 that is shaped to mate with a female portion (not shown) of a quick connect coupling. The valve body 816 also has a threaded end 818 that is designed to screw into the threaded first bore 814 of modified cover 803. Between its protuberant and threaded ends, the valve body 816 defines a valve bore 817 to accommodate the valve components as discussed below. There are, of course, a variety of quick connect couplings commercially available in the market place. Therefore, the size and shape of the protuberant end 819 should be selected with due regard for whichever type of female portion to which the protuberant end is to mate.

Disposed within valve bore 817, the valve stem piece 820 preferably has at its head end a poppet type valve 821. This poppet valve is normally compressed by a spring 822 against a valve stem seat 825 formed in the head end of valve bore 817. The lower end of spring 822 is held in place by a spring retainer or stop 824. This retainer 824 is held into place via an annular groove or other means formed in the valve bore 817 of valve body 816.

The extension 823 of dual valve apparatus 800 has an upper end 823a and a lower end 823b. These ends are axially offset from each other in such a way as to be accommodated, respectively, by the first and second bores 814 and 815 of modified cover 803. The top of upper end 823a is situated approximate a base end of valve stem piece 820. Similarly, the bottom of lower end 823b is situated approximate a top of check valve 210a.

Preferably, a dead space 866 is provided between the base end of valve stem piece 820 and the top of the upper end of extension 823. By virtue of this dead space, the poppet type valve 821 can be unseated from the valve stem seat 825 while the check valve 210a remains compressed against its check valve seat 209a formed at the top of its corresponding bore. With the poppet valve 821 unseated in this manner, the integrity of the check valve 210a can thus be conveniently and quickly tested.

Mating the female portion of the quick connect coupling to the protuberant end 819 of the dual valve apparatus causes the valve stem piece 820 to move inwardly against spring 822 so as to unseat poppet valve 821. Through such movement, the base end of valve stem piece 820 passes through and beyond dead space 866 and pushes the top of the upper end of extension 823. The bottom of the lower end of extension 823, in turn, drives check valve 210a off its valve seat 209a as extension 823 moves inwardly against the force of valve spring 15a. With both of the valves open, air is allowed to flow from the check valve bore into the second then the first bore 814 of modified cover 803. The flow of air continues past extension 823 into the valve bore 817 of valve body 816. Flowing past valve stem piece 820 and its poppet type valve 821, the air emerges from the protuberant end 819 of valve bore 817. Finally, the air stream passes into the female portion of the quick connect coupling. Check valve 210a, of course, serves as the access port in receiver body 205 through which to access the pressure in the brake cylinder. Using a pressure measuring device connected to the opposite end of the female portion, the brake cylinder pressure contained by the two valves can thus be quickly read.

As an optional feature of the invention, the valve stem piece 820, below its head end 821, could have grooves along its length so as to be fluted in cross section in a plane normal to its longitudinal axis. The upper and lower ends of extension 823 could also be fluted in cross section. With such grooves, the valve stem piece and extension would allow air to flow more smoothly through the dual valve apparatus 800. Whether or not these components feature fluted, rounded or alternatively shaped cross sections, the air flow capacity of the invention, as measured at the output of its protuberant end, is primarily determined by the seal made by an outer diameter of poppet valve 821 contacting an inner diameter of valve stem seat 825. As is apparent from FIG. 3, little air flow capacity is needed to assure accurate measurement of the pressure contained by the dual valve apparatus 800.

It should be apparent that the valve body 816 at its exposed end 819 could be shaped to form a female portion of a quick connect coupling. This, of course, would require that the aforementioned pressure measuring device be equipped or interconnected with a corresponding male portion for coupling with the female portion of this modified dual valve apparatus. This particular alternative is, however, not the preferred embodiment.

It should also be apparent that the dual valve apparatus 800 described herein can be applied not only to the brake cylinder check valve 210a but to any one or more of the other check valves 210b–d. Only the modified cover 803 need be altered in much the same manner as described above to accomplish this objective. From FIG. 1d it can be observed that certain of the check valves bores have diameters different than that occupied by the brake cylinder check valve 210a. Consequently, the modified cover 803 will have to be designed to accommodate one or more bosses of different diameters. The valve bodies 816 whose threaded ends screw into these bosses must, of course, be dimensioned accordingly. Depending on how many bosses the modified cover 803 is to accommodate, the dual valve apparatus of this invention can be used to enable a quick measurement of pressure within the brake cylinder, the brake pipe, the emergency reservoir and/or the auxiliary reservoir.

The dual valve apparatus 800 thus features both a primary valve and a backup valve to prevent leakage of the brake cylinder pressure when the protuberant end of valve body 816 sits unmated. Normally compressed against the valve stem seat 825, the poppet valve 821 serves as the primary valve as its position renders it most exposed to dust, dirt and/or other potential contaminants. Similarly, the check valve 210a lies normally compressed against its check valve seat 209a. Check valve 210a thus serves as a backup to the primary valve should the primary valve succumb to such contaminants or otherwise degrade. Conversely, should the check valve degrade, the poppet valve then serves as the bore 815 backup.

The presently preferred embodiment for carrying out the invention has been set forth in detail according to the Patent Act. Those persons of ordinary skill in the art to which this invention pertains may, nevertheless, recognize various alternative ways of practicing the invention without departing from the spirit and scope of the appended claims. Those of such skill will also recognize that the foregoing description is merely illustrative and not intended to limit any of the ensuing claims to any particular narrow interpretation.

Accordingly, to promote the progress of science and useful arts, we secure for ourselves by Letters Patent exclusive rights to all subject matter embraced by the following claims for the time prescribed by the Patent Act.

We claim:

1. A dual valve apparatus for enabling quick measurement of pressure through a receiver assembly, such receiver assembly having a receiver body, a cover for such receiver body and at least one check valve housed in such receiver body wherein such check valve is accessible by removal of such cover, such check valve being normally compressed against a check valve seat formed in such receiver body to provide a first seal that prevents leakage of such pressure, said apparatus comprising:

(a) a modified cover for such receiver body defining first and second bores axially offset from and in communication with one another with said first bore being at least partially threaded and said second bore aligned generally with such check valve when said modified cover is secured to such receiver body;

(b) a valve body defining a valve bore therethrough from a protuberant end of said valve body to a threaded end of said valve body, said protuberant end being shaped to mate with a female portion of a quick connect coupling, said threaded end for screwing into said first bore of said modified cover; and (c) a valve stem movable within said bores with a head end thereof normally compressed against a valve stem seat formed in said valve bore approximate said protuberant end to provide a second seal that further prevents leakage of such pressure; such that mating such female portion to said protuberant end causes said valve stem to move away from said valve stem seat thereby moving such check valve away from such check valve seat and providing access to and enabling measurement of such pressure.

2. The dual valve apparatus recited in claim 1 wherein said valve stem is any one of fluted, rounded and polygonal in cross section.

3. The dual valve apparatus recited in claim 2 wherein air flow capacity of said dual valve apparatus is primarily determined by said second seal made by an outer diameter of said head end contacting an inner diameter of said valve stem seat.

4. The dual valve apparatus recited in claim 1 wherein said valve stem includes:

(a) a valve stem piece disposed within said valve bore with said head end thereof shaped as a poppet valve that is spring loaded against said valve stem seat; and (b) an extension having an upper end thereof axially offset from a lower end thereof with a top of said upper end being situated approximate a base end of said valve stem piece and a bottom of said lower end being situated approximate a top of such check valve; such that mating such female portion with said protuberant end causes said valve stem piece with said poppet valve thereof to move from said valve stem seat and push said extension to unseat such check valve thereby providing access to and enabling measurement of such pressure.

5. The dual valve apparatus recited in claim 4 wherein a dead space is provided between said base end of said valve stem piece and said top of said upper end of said extension.

6. The dual valve apparatus recited in claim 1 wherein such pressure is at least one of brake cylinder pressure, brake pipe pressure, emergency reservoir pressure and auxiliary reservoir pressure.

7. The dual valve apparatus recited in claim 6 wherein such pressure is such brake cylinder pressure.

8. A dual valve apparatus for enabling quick measurement of pressure through a receiver assembly, such receiver assembly having a receiver body, a cover for such receiver body and at least one check valve housed in such receiver body wherein such check valve is accessible by removal of such cover, such check valve being normally compressed against a check valve seat formed in such receiver body to provide a first seal that prevents leakage of such pressure, said apparatus comprising:

(a) a modified cover defining first and second bores axially offset from and in communication with one another with said first bore being at least partially threaded and said second bore aligned generally with such check valve when said modified cover is secured to such receiver body;

(b) a valve body defining a valve bore therethrough from a protuberant end of said valve body to a threaded end of said valve body, said protuberant end being shaped to mate with a female portion of a quick connect coupling, said threaded end for screwing into said first bore of said modified cover;

(c) a valve stem piece disposed within said valve bore having at a head end thereof a poppet valve movable within said valve bore that is normally compressed against a valve stem seat formed in said valve body to provide a second seal that further prevents leakage of such pressure; and (d) an extension having an upper end thereof axially offset from a lower end thereof with a top of said upper end being situated a dead space apart from a base end of said valve stem piece and a bottom of said lower end being situated approximate a top of such check valve; such that mating such female portion with said protuberant end causes said valve stem piece with said poppet valve thereof to move from said valve stem seat and push said extension to unseat such check valve thereby providing access to and enabling measurement of such pressure.

9. The dual valve apparatus recited in claim 8 wherein at least one of said valve stem piece and said extension is any one of fluted, rounded and polygonal in cross section.

10. The dual valve apparatus recited in claim 9 wherein air flow capacity of said dual valve apparatus is primarily determined by said second seal made by an outer diameter of said poppet valve contacting an inner diameter of said valve stem seat.

11. The dual valve apparatus recited in claim 8 wherein such pressure is at least one of brake cylinder pressure, brake pipe pressure, emergency reservoir pressure and auxiliary reservoir pressure.

12. The dual valve apparatus recited in claim 11 wherein such pressure is such brake cylinder pressure.

13. The dual valve apparatus recited in claim 8 further including a protective cap to cover said protuberant end to protect said dual valve apparatus from contaminants when not in use.

14. A dual valve apparatus for enabling quick measurement of pressure contained within a housing, such housing having a main body, a cover for such main body and at least one check valve housed in such main body wherein such check valve is accessible by removal of such cover, such check valve being normally compressed against a check valve seat formed in such main body to provide a first seal that prevents leakage of such pressure, said apparatus comprising:

(a) a modified cover defining first and second bores axially offset from and in communication with one another with said first bore being at least partially threaded and said second bore aligned generally with such check valve when said modified cover is secured to such main body;

(b) a valve body defining a valve bore therethrough from an exposed end of said valve body to a threaded end of said valve body, said exposed end being shaped to form a first portion of a quick connect coupling, said threaded end for screwing into said first bore of said modified cover;

(c) a valve stem piece disposed within said valve bore having at a head end thereof a poppet valve movable within said valve bore that is normally compressed against a valve stem seat formed in said valve body to provide a second seal that further prevents leakage of such pressure; and (d) an extension having an upper end thereof axially offset from a lower end thereof with a top of said upper end being situated approximate a base end of said valve stem piece and a bottom of said lower end being situated approximate a top of such check valve; such that mating a second portion of such quick connect coupling with said exposed end causes said valve stem piece with said poppet valve thereof to move from said valve stem seat and push said extension to unseat such check valve thereby providing access to and enabling measurement of such pressure.

15. The dual valve apparatus recited in claim 14 wherein a dead space is provided between said base end of said valve stem piece and said top of said upper end of said extension.

16. The dual valve apparatus recited in claim 14 wherein said first and such second portions of such quick connect coupling are male and female, respectively.

17. The dual valve apparatus recited in claim 14 wherein at least one of said valve stem piece and said extension is any one of fluted, rounded and polygonal in cross section.

18. The dual valve apparatus recited in claim 17 wherein air flow capacity of said dual valve apparatus is primarily determined by said second seal made by an outer diameter of said poppet valve contacting an inner diameter of said valve stem seat.

19. The dual valve apparatus recited in claim 14 further including a protective cap to cover said exposed end to protect said dual valve apparatus from contaminants when not in use.

* * * * *